US012589328B2

(12) United States Patent
Mendell et al.

(10) Patent No.: US 12,589,328 B2
(45) Date of Patent: Mar. 31, 2026

(54) SYSTEM FOR PRODUCING OZONE-INFUSED CRYSTALLINE SOLIDS

(71) Applicant: ONZA CORP., Denver, CO (US)

(72) Inventors: Paul Mendell, Castle Rock, CO (US);
Stephen Goldman, Denver, CO (US);
Eric Anderson, Denver, CO (US)

(73) Assignee: Onza Corp., Denver, CO (US)

( * ) Notice: Subject to any disclaimer, the term of this
patent is extended or adjusted under 35
U.S.C. 154(b) by 601 days.

(21) Appl. No.: 17/912,437

(22) PCT Filed: Mar. 19, 2021

(86) PCT No.: PCT/US2021/023305
§ 371 (c)(1),
(2) Date: Sep. 16, 2022

(87) PCT Pub. No.: WO2021/188989
PCT Pub. Date: Sep. 23, 2021

(65) Prior Publication Data
US 2023/0144935 A1      May 11, 2023

Related U.S. Application Data

(60) Provisional application No. 62/992,133, filed on Mar.
19, 2020.

(51) Int. Cl.
*C30B 35/00* (2006.01)
*A23B 2/704* (2025.01)
(Continued)

(52) U.S. Cl.
CPC .......... *B01D 9/0018* (2013.01); *A23B 2/7045*
(2025.01); *A23B 2/712* (2025.01); *B01D*
*9/0063* (2013.01)

(58) Field of Classification Search
CPC .... C30B 7/00; C30B 7/02; C30B 7/04; C30B
35/00; C30B 35/007; B01D 9/00;
(Continued)

(56) References Cited

U.S. PATENT DOCUMENTS 2,643,941 A * 6/1953 Douglass ................. C01D 3/14
422/245.1
5,549,919 A 8/1996 Ueno et al.
(Continued)

FOREIGN PATENT DOCUMENTS

CN      1808286      7/2006
CN      1878787      12/2006
(Continued)

OTHER PUBLICATIONS

International Search Report and Written Opinion prepared by the
U.S. Patent and Trademark Office for International (PCT) Patent
Application No. PCT/US2021/023305, dated Jul. 28, 2021, 24
pages.
(Continued)

*Primary Examiner* — Kenneth A Bratland, Jr.
(74) *Attorney, Agent, or Firm* — Sheridan Ross P.C.

(57) ABSTRACT

Methods and systems are provided for infusing a crystalline
and/or porous solid with a desired fluid, particularly an
antimicrobial agent, as well as infused crystalline and/or
porous solids produced thereby. Solids which may be
infused with an antimicrobial agent according to the inven-
tion include erythritol, table salt, table sugar, baking soda,
calcium carbonate, acetic acid, ascorbic acid, and marsh-
mallow.

5 Claims, 3 Drawing Sheets

(51) Int. Cl.
    *A23B 2/712*      (2025.01)
    *B01D 9/00*       (2006.01)

(58) Field of Classification Search
    CPC .... B01D 9/0018; B01D 9/0031; B01D 9/005;
          B01D 9/0063; A23B 2/712; A23B 2/7045
    USPC ....... 117/11, 68, 70, 84, 200, 204, 206, 224;
                             422/243, 245.1
    See application file for complete search history.

(56) References Cited

U.S. PATENT DOCUMENTS

| | | | |
|---|---|---|---|
| 6,713,113 B2 | 3/2004 | Bisperink et al. | |
| 6,935,049 B2 | 8/2005 | Alstat | |
| 8,231,369 B2 | 7/2012 | Rajala et al. | |
| 8,257,741 B2 | 9/2012 | Curatolo et al. | |
| 9,138,429 B2 | 9/2015 | Wise et al. | |
| 9,765,271 B2 | 9/2017 | Myrick | |
| 2002/0190404 A1* | 12/2002 | Baarda ...................... | C02F 1/78 |
| | | | 261/118 |
| 2005/0287318 A1 | 12/2005 | Speer et al. | |
| 2006/0112639 A1 | 6/2006 | Nick et al. | |
| 2009/0317504 A1* | 12/2009 | Rajala ........................ | B01J 2/04 |
| | | | 977/773 |
| 2010/0254928 A1 | 10/2010 | Yamazaki et al. | |
| 2015/0308685 A1* | 10/2015 | Iyoha ...................... | F23L 15/02 |
| | | | 431/11 |
| 2016/0289709 A1 | 10/2016 | Medoff | |
| 2018/0297844 A1* | 10/2018 | Rodan .................. | H05H 1/2406 |
| 2020/0114277 A1* | 4/2020 | Jiang ........................ | C01D 9/00 |

FOREIGN PATENT DOCUMENTS

| | | |
|---|---|---|
| CN | 101967020 | 2/2011 |
| CN | 105413423 | 3/2016 |
| JP | H07-102240 | 4/1995 |
| JP | H10-139645 | 5/1998 |
| TW | 200603819 | 2/2006 |
| WO | WO 00/65911 | 11/2000 |
| WO | WO 2005/079818 | 9/2005 |
| WO | WO 2013/077436 | 5/2013 |
| WO | WO 2017/196933 | 11/2017 |

OTHER PUBLICATIONS

Ho et al., "Encapsulation of gases in powder solid matrices and their applications: A review," Powder Technology, vol. 259, Mar. 28, 2014, pp. 87-108.

Official Action (with English translation) for China Patent Application No. 202180033539.5, dated Oct. 14, 2024, 6 pages.

Extended European Search Report for Europe Patent Application No. 21771044.1, dated Apr. 3, 2024, 7 pages.

International Search Report and Written Opinion for International (PCT) Patent Application No. PCT/US2021/023305, dated Jul. 28, 2021, 24 pages.

Official Action (with English translation) for China Patent Application No. 202180033539.5, dated Dec. 26, 2023, 25 pages.

Official Action (with English translation) for Japan Patent Application No. 2022-556576, dated Oct. 24, 2023, 10 pages.

\* cited by examiner

SYSTEM FOR PRODUCING OZONE-INFUSED CRYSTALLINE SOLIDS

CROSS REFERENCE TO RELATED APPLICATIONS

This application is a national stage application under 35 U.S.C. 371 and claims the benefit of PCT Application No. PCT/US2021/023305 having an international filing date of 19 Mar. 2021, which designated the United States, which PCT application claimed the benefit of and priority, under 35 U.S.C. § 119 (e), to U.S. Provisional Application Ser. No. 62/992,133, filed 19 Mar. 2020, the entirety of each of which are hereby incorporated herein by reference.

FIELD OF THE INVENTION

The present disclosure relates generally to articles, methods, and systems for delivering antimicrobials, and specifically to the infusion of molecules of a gas-phase antimicrobial into the lattice structure, grain boundaries and fluid inclusions of a crystalline solid and/or into the pores of a porous solid.

BACKGROUND OF THE INVENTION

The combined global consumption of just three crystalline or potentially crystalline food products—table salt (sodium chloride), table sugar (sucrose), and baking soda (sodium bicarbonate)—exceeds 300 million tons per year. Of these, table salt and baking soda are typically consumed in their crystalline forms; delivery of table sugar in its crystalline form is less frequent, but still commonly known and encountered.

The crystals of crystalline solids often contain fluid inclusions, i.e. molecules of liquid and/or gas that are contained within a crystal of the lattice structure and/or occupy a "gap" or "hole" in the lattice structure. Fluids also become trapped within crystal-crystal boundaries. The fluids included in the crystalline solids are generally representative of the liquids and/or gases present in the environment at the time of crystallization of the crystalline solid. Such fluids commonly include atmospheric gases, molecular hydrogen and molecular helium, especially when the crystals are formed in the presence of water and/or air, but may also include any other molecule sufficiently small to be contained within a crystal of the lattice structure or a hole therein, or between crystal-crystal boundaries and/or within fluid inclusions.

The possibility of providing methods by which a desired liquid and/or gas is intentionally introduced into the environment of a solid prior to crystallization, such that the desired liquid and/or gas is present in the crystalline solid as a fluid inclusion after crystallization, has not heretofore been investigated or pursued in any depth. Trapping desired fluids such as gas-phase antimicrobial agents, at room temperature and over various pressures, would be highly advantageous in that they would make delivery of the desired fluid to a consumer simpler, easier, less time-consuming, and less expensive.

Similar considerations are attendant to solids that are not crystalline, but are porous. By way of non-limiting example, it would be advantageous to trap molecules of a desired fluid within pores of, e.g., marshmallow or another porous solid by providing the desired fluid in combination with the solid prior to or during pore formation.

There is thus a need in the art for methods and systems for introducing a desired fluid, particularly under room temperature conditions, into the lattice structure, grain boundaries, and/or fluid inclusions of crystalline solids and/or the pores of a porous solid, and for crystalline and/or porous solids obtained thereby. There is a further need for articles of manufacture comprising such solids, which may be used, by way of non-limiting example, to enhance a characteristic (e.g. shelf life) of an accompanying non-crystalline and/or non-porous food product.

Ozone is a triatomic form of oxygen ($O_3$) that is a gas at standard conditions and whose oxidative antimicrobial effect, even at relatively low (ppm) concentrations, has been known for at least 75 years. Ozone solubilized in water (e.g. as a rinse, mist, spray, or bath) has thus long been used as an antimicrobial and disinfectant, in large part because it advantageously decomposes into ordinary diatomic oxygen ($O_2$) on short timescales, usually about a few minutes.

Many methods and systems for antimicrobial treatment using ozone are known, but these generally require significant energy inputs, as they typically entail strong UV radiation or ionization of the air surrounding the item, volume, space, environment, etc. to be treated. There is thus also a need in the art for simpler, cheaper methods of ozone antimicrobial treatment.

SUMMARY OF THE INVENTION

In one aspect of the present invention, a method for producing crystals of a solid infused with a gas-phase antimicrobial agent comprises providing a solution of the solid in a solvent; introducing the gas-phase antimicrobial agent into the solution; and crystallizing the solid.

In embodiments, the solid may be selected from the group consisting of erythritol, sodium chloride, magnesium sulfate, sucrose, sodium bicarbonate, potassium chloride, calcium carbonate, sugar alcohols, acetic acid, and ascorbic acid.

In embodiments, the gas-phase antimicrobial agent may be at least one of a bactericide and a virucide. The gas-phase antimicrobial agent may, but need not, be ozone.

In embodiments, the solvent may consist essentially of water.

In embodiments, the introducing step may comprise spraying the solution into a volume containing a gas, wherein the gas contained in the volume comprises the gas-phase antimicrobial agent. The crystallizing step may, but need not, comprise flowing a carrier gas through the volume to remove residual solvent from the volume and allow the solid to crystallize on interior surfaces of the volume. The carrier gas may, but need not, comprise the gas-phase antimicrobial agent.

In another aspect of the present invention, an infused crystalline solid comprises a solid lattice structure; and at least one molecule of a gas-phase antimicrobial agent, present within at least one of a crystal of the lattice structure, a hole in the lattice structure, a crystal-crystal grain boundary of the lattice structure, and a fluid inclusion of a crystal of the lattice structure.

In embodiments, the solid may be selected from the group consisting of erythritol, sodium chloride, magnesium sulfate, sucrose, sodium bicarbonate, potassium chloride, calcium carbonate, sugar alcohols, acetic acid, and ascorbic acid.

In embodiments, the gas-phase antimicrobial agent may be at least one of a bactericide and a virucide. The gas-phase antimicrobial agent may, but need not, be ozone.

In embodiments, the solid may be made by a method as disclosed herein.

In another aspect of the present invention, an absorbent antimicrobial article comprises an infused crystalline solid as disclosed herein.

In embodiments, the absorbent antimicrobial article may further comprise a sheet material impregnated with the infused crystalline solid. The sheet material may, but need not, be selected from the group consisting of paper and plastic.

In another aspect of the present invention, a container for meat or raw produce comprises an absorbent antimicrobial article as disclosed herein.

In another aspect of the present invention, a method for producing an ozonated crystalline solid comprises (a) generating a gas stream comprising ozone and flowing the gas stream into or through a sealable chamber; (b) spraying a solution of a crystalline solid in a solvent into the sealable chamber; (c) removing residual solvent from the sealable chamber by flowing a first carrier gas through the sealable chamber to allow the ozonated crystalline solid to crystallize on interior surfaces of the sealable chamber; and (d) removing residual ozone from the sealable chamber.

In embodiments, the crystalline solid may be selected from the group consisting of erythritol, sodium chloride, magnesium sulfate, sucrose, sodium bicarbonate, potassium chloride, calcium carbonate, sugar alcohols, acetic acid, and ascorbic acid.

In embodiments, the solvent may consist essentially of water.

In embodiments, the first carrier gas may comprise ozone.

In embodiments, step (a) may comprise the sub-steps of (i) producing an oxygen-enriched gas stream by selectively removing nitrogen from ambient air; and (ii) converting at least a portion of diatomic oxygen in the oxygen-enriched gas stream to ozone.

In embodiments, when step (b) is carried out, ozone may make up at least about 6.0 wt % of a total gas content of the sealable chamber.

In embodiments, a temperature of the solution may be about 170° F.

In embodiments, the solution may be pressurized to at least about 35 psi before being sprayed into the sealable chamber.

In embodiments, step (b) may be carried out at least twice.

In embodiments, step (d) may comprise applying a negative pressure to the sealable chamber to evacuate residual ozone from the sealable chamber.

In embodiments, step (d) may comprise flowing a second carrier gas through the sealable chamber to entrain and remove at least one of residual ozone and residual solvent from the sealable chamber. The second carrier gas may, but need not, comprise nitrogen.

In embodiments, the method may further comprise (e) collecting the ozonated crystalline solid from interior surfaces of the sealable chamber.

In another aspect of the present invention, a system for producing an ozonated crystalline solid comprises at least one ozone generator, configured to receive an oxygen-enriched gas stream and convert at least a portion of diatomic oxygen in the oxygen-enriched gas stream to ozone to form an ozone-containing gas stream; a sealable chamber, configured to receive the ozone-containing gas stream from the at least one ozone generator; a heat source, configured to receive and heat a solution of a crystalline solid in a solvent; a pressure vessel, configured to pre-pressurize the solution; an atomizer, configured to receive the pre-pressurized solution from the pressure vessel, further pressurize the solution, and dispense the solution in atomized form into the sealable chamber via a nozzle; a heat trace, configured to heat a manifold and a high-pressure line of the atomizer prior to dispensation of the solution into the sealable chamber; and a nitrogen source, configured to flow nitrogen through the sealable chamber after dispensation of the solution into the sealable chamber to remove residual ozone from the sealable chamber.

In embodiments, the system may further comprise an oxygen concentrator, configured to produce the oxygen-enriched gas stream by selectively removing nitrogen from ambient air.

In embodiments, the crystalline solid may be selected from the group consisting of erythritol, sodium chloride, magnesium sulfate, sucrose, sodium bicarbonate, potassium chloride, calcium carbonate, sugar alcohols, acetic acid, and ascorbic acid.

In embodiments, the solvent may consist essentially of water.

In another aspect of the present invention, a method for antimicrobial treatment of a target object comprises (a) providing crystals of a crystalline solid infused with a gas-phase antimicrobial agent; and (b) placing crystals of the crystalline solid within or on a surface of the target object or in an environment surrounding the target object.

In embodiments, the crystalline solid may be selected from the group consisting of erythritol, sodium chloride, magnesium sulfate, sucrose, sodium bicarbonate, potassium chloride, calcium carbonate, sugar alcohols, acetic acid, and ascorbic acid.

In embodiments, the gas-phase antimicrobial agent may be at least one of a bactericide and a virucide. The gas-phase antimicrobial agent may, but need not, be ozone.

In embodiments, step (a) may comprise making crystals of a crystalline solid by a method as disclosed herein.

In embodiments, in step (b), the crystals of the crystalline solid may be contained in an absorbent antimicrobial article. The absorbent antimicrobial article may, but need not, comprise a sheet material impregnated with the crystals of the crystalline solid. The sheet material may, but need not, be selected from the group consisting of paper and plastic.

In embodiments, the gas-phase antimicrobial agent may be released into the environment surrounding the target object upon dissolution of the crystals in a liquid present in the environment.

In embodiments, the method may further comprise (c) causing at least a portion of the crystals to dissolve or become amorphous, thereby releasing at least a portion of the gas-phase antimicrobial agent into or onto the target object or into the environment surrounding the target object.

In embodiments, step (c) may comprise modifying at least one of a temperature of the target object, a temperature of the environment surrounding the target object, a moisture content of the target object, or a humidity of the environment surrounding the target object.

In aspects of the present disclosure, a method for infusing crystals of a food product with a gas-phase antimicrobial agent comprises providing a solution of the food product in a food-grade solvent; introducing the gas-phase antimicrobial agent into the solution; and crystallizing the food product.

In embodiments, the food product may be selected from the group consisting of sodium chloride, magnesium sulfate, sucrose, sodium bicarbonate, potassium chloride, calcium carbonate, sugar alcohols, acetic acid, and ascorbic acid.

In embodiments, the gas-phase antimicrobial agent may be at least one of a bactericide and a virucide. The gas-phase antimicrobial agent may, but need not, be ozone.

In embodiments, the food-grade solvent may consist essentially of water.

In aspects of the present disclosure, a method for infusing pores of a food product with a gas-phase antimicrobial agent comprises providing a liquid precursor of the food product; introducing the gas-phase antimicrobial agent into the liquid precursor; and aerating the liquid precursor to form the food product.

In embodiments, at least one of the following may be true: (i) the liquid precursor comprises sugar, water, and a protein source; and (ii) the food product is marshmallow. The protein source may, but need not, be selected from the group consisting of albumen and gelatin.

In embodiments, the gas-phase antimicrobial agent may be at least one of a bactericide and a virucide. The gas-phase antimicrobial agent is ozone.

In aspects of the present disclosure, an infused crystalline food product comprises a food product lattice structure; and at least one molecule of a gas-phase antimicrobial agent, present within at least one of a crystal of the lattice structure, a hole in the lattice structure, a crystal-crystal grain boundary of the lattice structure, and a fluid inclusion of a crystal of the lattice structure.

In embodiments, the food product may be selected from the group consisting of sodium chloride, magnesium sulfate, sucrose, sodium bicarbonate, potassium chloride, calcium carbonate, sugar alcohols, acetic acid, and ascorbic acid.

In embodiments, the gas-phase antimicrobial agent may be at least one of a bactericide and a virucide. The gas-phase antimicrobial agent may, but need not, be ozone.

In aspects of the present disclosure, an infused porous food product comprises a food product having a plurality of pores; and at least one molecule of a gas-phase antimicrobial agent present within at least one pore of the plurality of pores.

In embodiments, the food product may be marshmallow.

In embodiments, the gas-phase antimicrobial agent may be at least one of a bactericide and a virucide. The gas-phase antimicrobial agent may, but need not, be ozone.

In aspects of the present disclosure, an absorbent antimicrobial article comprises an infused crystalline food product as disclosed herein.

In embodiments, the absorbent antimicrobial article may further comprise a sheet material impregnated with the infused crystalline food product. The sheet material may, but need not, be selected from the group consisting of paper and plastic.

In aspects of the present disclosure, an absorbent antimicrobial article comprises an infused porous food product as disclosed herein.

In embodiments, the absorbent antimicrobial article may consist essentially of the infused porous food product.

In aspects of the present disclosure, a container for a meat product comprises an absorbent antimicrobial article as disclosed herein.

DETAILED DESCRIPTION OF THE INVENTION

Figure 1:
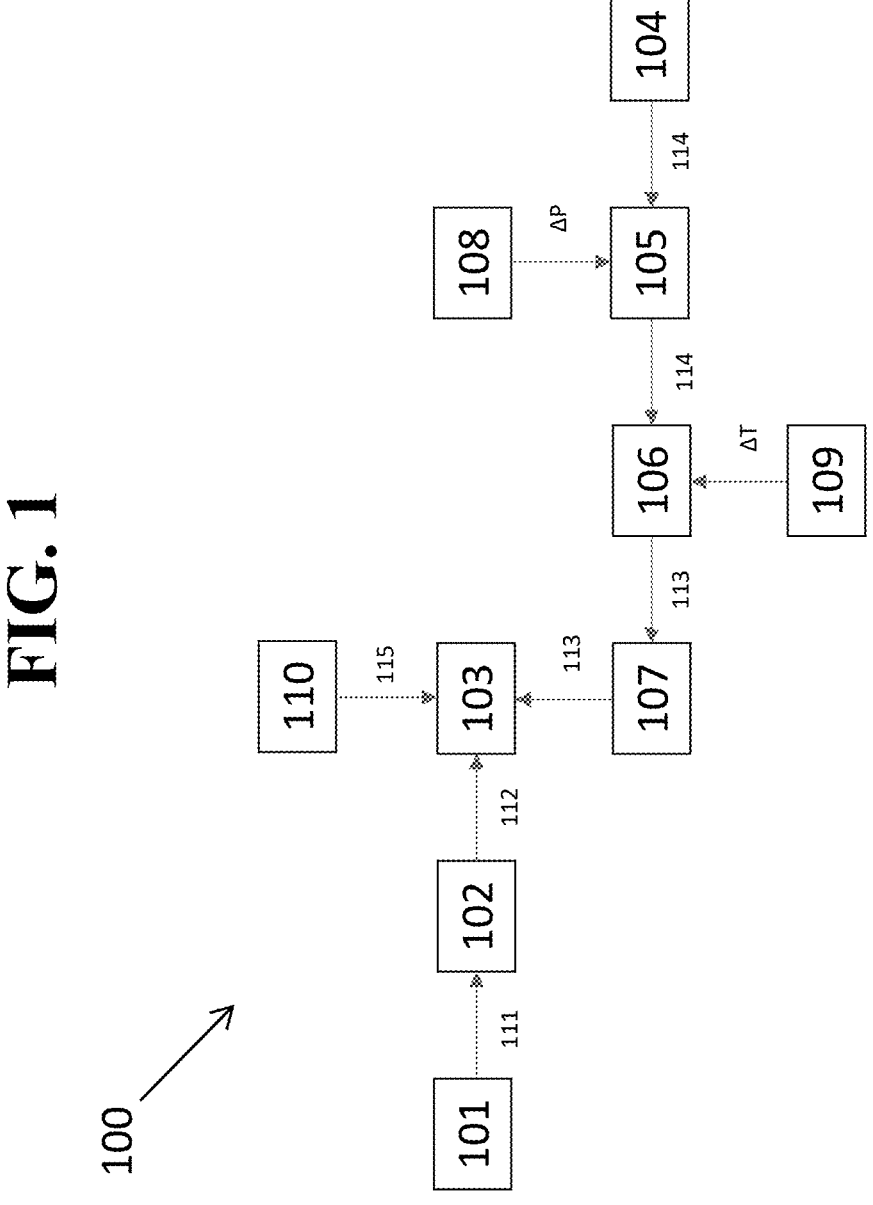
FIG. 1 is a block diagram of a system for producing an ozonated crystalline solid, according to embodiments of the present disclosure.

As used herein, unless otherwise specified, the term "crystalline" refers to any material that may, at atmospheric pressure and room temperature, be a solid composed of an arrangement of atoms in a highly ordered microscopic structure to form a crystal lattice extending in all directions.

As used herein, unless otherwise specified, the term "meat" refers to any portion of the body of an animal that is intended to be consumed by a human or a domesticated animal.

As used herein, unless otherwise specified, the term "pathogenic" refers to any organism that causes illness in humans or domesticated animals, whether by infection with the organism or by consumption of toxins produced by the organism.

As used herein, the term "raw produce" refers to uncooked plant matter that is intended to be consumed by a human or a domesticated animal.

As used herein, unless otherwise specified, the terms "about," "approximately," etc., when used in relation to numerical limitations or ranges, mean that the recited limitation or range may vary by up to 10%. By way of non-limiting example, "about 750" can mean as little as 675 or as much as 825, or any value therebetween. When used in relation to ratios or relationships between two or more numerical limitations or ranges, the terms "about," approximately," etc. mean that each of the limitations or ranges may vary by up to about 10%; by way of non-limiting example, a statement that two quantities are "approximately equal" can mean that a ratio between the two quantities is as little as 0.9:1.1 or as much as 1.1:0.9 (or any value therebetween), and a statement that a four-way ratio is "about 5:3:1:1" can mean that the first number in the ratio can be any value between 4.5 and 5.5, the second number in the ratio can be any value between 2.7 and 3.3, and so on.

As used herein, "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B, and C together.

It is to be noted that the term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The embodiments and configurations described herein are neither complete nor exhaustive. As will be appreciated, other embodiments of the invention are possible utilizing, alone or in combination, one or more of the features set forth above or described in detail below.

The present disclosure provides methods and systems for infusing crystals of a crystalline solid and/or pores of a porous solid with a gas-phase antimicrobial agent, as well as crystalline and/or porous solids containing gas-phase antimicrobial agents produced according to such methods and systems. The present disclosure further provides articles of manufacture comprising such crystalline and/or porous solids, such that the gas-phase antimicrobial agent may be delivered or released in a desired manner and/or at a desired rate.

In embodiments of methods of the present disclosure, the method begins by providing a solution of a potentially crystalline solid in a solvent; the solution may be provided by any suitable means, including but not limited to providing a source of the solid in crystalline form and dissolving the solid in the solvent. Solutions of many crystalline solids, and methods of manufacture thereof, are well-known, especially where the solvent is water (e.g. brine (table salt in water) and simple syrup (table sugar in water)).

After providing the solution, the gas-phase antimicrobial agent is introduced into the solution by any suitable means. By way of non-limiting example, the gas-phase antimicrobial agent may be introduced into the solution by bubbling the gas-phase antimicrobial agent, e.g. as microscale and/or nanoscale bubbles, into the solution, and/or by dispersing a spray, mist, atomized burst, etc. of the solution into a volume of gas comprising the gas-phase antimicrobial agent.

Finally, after the gas-phase antimicrobial agent is introduced into the solution, crystals of the infused solid may be formed and, optionally, separated and/or removed from the solvent. The crystals may be formed by any suitable method of crystallization, including but not limited to evaporation of the solvent, precipitation (e.g. temperature-induced precipitation, introduction of a precipitating agent, etc.), or chemical dehydration (where the solvent is water). The degree of fluid inclusion, crystal-on-crystal dynamics, and grain morphology, and hence the volume of the gas-phase antimicrobial agent contained within the crystalline solid after crystallization, is dependent upon the kinetics of crystallization and the design of the vessel. Thus, the anti-microbial content and effect of the infused crystalline solid may be controlled or tuned by controlling parameters of crystallization, such as temperature and pressure, within a mixing vessel in which the solution is held or introduced. Crystals that have been separated and/or removed from the solvent may, but need not, be subjected to further processing, including but not limited to bulk shipment.

Additionally and/or alternatively, crystals of the infused solid may be formed by solution and evaporation processes under a gas headspace, wherein the gas headspace comprises the gas-phase antimicrobial agent. Such manner of evaporation and recrystallization may occur at room temperatures so as to not effect or catalyze a reaction which would produce undesirable by-products.

The crystalline solid may comprise any one or more substances that may be delivered in crystalline form. By way of non-limiting example, solids that may be infused with gas-phase antimicrobial agents according to the present disclosure include table sugar, baking soda, table salt and any other chemical salt (e.g. potassium chloride), erythritol, and the like.

In some embodiments, the crystalline solid may be a sugar. Non-limiting examples of sugars that may be used in the practice of the present invention include sucrose, lactose, fructose, glucose, lyxose, xylose, arabinose, ribose, allose, altrose, mannose, gulose, iodose, talose, maltose, galactose, trehalose, cellobiose, isomaltose, lactulose, turanose, maltotriose, melezitose, raffinose, stachyose, and fructooligosaccharides.

In some embodiments, the crystalline solid may be a sugar alcohol. Non-limiting examples of sugar alcohols that may be used in the practice of the present invention include erythritol, glycerol, ethylene glycol, threitol, arabitol, xylitol, ribitol, mannitol, sorbitol, galactitol, fucitol, iditol, inositol, volemitol, isomalt, maltitol, lactitol, maltotriitol, maltotetraitol, polyglycitol, acesulfame potassium, and isomaltulose.

In some embodiments, the crystalline solid may be a sugar acid. Non-limiting examples of sugar acids that may be used in the practice of the present invention include tartaric acid, citric acid, malic acid, succinic acid, malonic acid, glutaric acid, and suberic acid.

In some embodiments, the crystalline solid may be a non-sugar carbohydrate. Non-limiting examples of non-sugar carbohydrates that may be used in the practice of the present invention include microcrystalline cellulose, beta glucan, inulin, resistant starch, pectin, hemicellulose, galactan, arabinoxylan, xanthan gum, agar, dextran, agarose, agaropectin, gelatin, isomaltooligosaccharide, maltodextrin, β-glucan, chitosan, dextrin, alpha-cyclodextran, beta-cyclodextran, Sephadex LH-20, Sephadex G-10, Sephadex G-15, Sephadex G-25, and Sephadex G-100.

In some embodiments, the crystalline solid may be selected from the group consisting of magnesium carbonate, magnesium bicarbonate, and carrageenan.

In some embodiments, the crystalline solid may be a salt. Non-limiting examples of salts that may be used in the practice of the present invention include sodium polyacrylate, polyacrylate, potassium bitartrate, potassium sodium tartrate tetrahydrate, potassium fluoride, sodium fluoride, cesium fluoride, rubidium fluoride, lithium fluoride, potassium acetate, sodium acetate, potassium formate, sodium formate, potassium oxalate, sodium oxalate, monopotassium phosphate, dipotassium phosphate, tripotassium phosphate, monosodium phosphate, disodium phosphate, trisodium phosphate, potassium hydrogen phosphate, sodium hydrogen phosphate, potassium dihydrogen phosphate, sodium dihydrogen phosphate, calcium sulfate, sodium sulfate, and potassium sulfate.

In further embodiments of methods of the present disclosure, the method begins by providing a liquid precursor of a potentially porous solid in a solvent. Liquid precursors of porous solids, and methods of manufacture thereof, are well-known; a non-limiting example of such a liquid precursor is a mixture or solution of sugar, water, and a protein source (e.g. albumen or gelatin), which is a precursor of marshmallow.

After providing the liquid precursor, the gas-phase antimicrobial agent is introduced into the liquid precursor by any suitable means. By way of non-limiting example, the gas-phase antimicrobial agent may be introduced into the liquid precursor by bubbling the gas-phase antimicrobial agent, e.g. as microscale and/or nanoscale bubbles, into the liquid precursor, and/or by dispersing a spray, mist, atomized burst, etc. of the liquid precursor into a volume of gas comprising the gas-phase antimicrobial agent.

Finally, after the gas-phase antimicrobial agent is introduced into the liquid precursor, the porous solid is formed, generally (but not necessarily) by aeration. Aeration may be carried out by any suitable means. The degree of fluid inclusion and pore morphology, and hence the volume of the gas-phase antimicrobial agent contained within the porous solid after pore formation, is dependent upon the kinetics of aeration and/or pore formation and the design of the vessel. Thus, the anti-microbial content and effect of the infused porous solid may be controlled or tuned by controlling parameters of aeration and/or pore formation, such as temperature and pressure, within a mixing vessel in which the liquid precursor is held.

Another parameter that may be controlled to thereby control or tune the anti-microbial content and effect of the infused porous solid is the porosity of the porous solid. By way of non-limiting example, the porous solid may have a porosity of up to about 5%, up to about 10%, up to about 15%, up to about 20%, up to about 25%, up to about 30%, up to about 35%, up to about 40%, up to about 45%, up to about 50%, up to about 55%, up to about 60%, up to about 65%, up to about 70%, up to about 75%, up to about 80%, up to about 85%, up to about 90%, or up to about 95%. The porosity of the porous solid may affect the proportion of pores in which the anti-microbial agent is present, the rate of release and/or diffusion of the anti-microbial agent from the pores, and so on.

Additionally and/or alternatively, the infused porous solid may be formed by whipping the liquid precursor under a gas headspace, and/or by dispersing a spray, mist, atomized burst, etc. of the solution into a gas headspace comprising the gas-phase antimicrobial agent, wherein the gas headspace comprises the gas-phase antimicrobial agent. Such manner of pore formation may occur at room temperatures so as to not effect or catalyze a reaction which would produce undesirable by-products.

The porous solid may comprise any one or more substances that may be delivered in porous form. By way of non-limiting example, solids that may be infused with gas-phase antimicrobial agents according to the present disclosure include marshmallow.

The crystalline and/or porous solids of the present disclosure may be utilized to extend the shelf life of a food product with which it is packaged. Particularly, infused solids of the disclosure (and/or articles of manufacture made therefrom, such as paper or plastic liners and the like) may be provided within or as part of the packaging of meat or raw produce, e.g. beef products, pork products, poultry products, fish products, bagged salad products and similar raw fruit and vegetable products, etc. In embodiments, the infused solid (or article of manufacture containing it) may be adapted to absorb or otherwise receive blood, condensation, or other liquids from the meat or raw produce, whereupon the solid may dissolve and release the antimicrobial agent into the packaging. In this way, meat or raw produce may be subjected to antimicrobial treatment even after packaging and shipment (e.g. while stored in a grocery store refrigerator case awaiting purchase), thereby significantly extending the shelf life of the meat or raw produce without damaging, and in some embodiments while even enhancing, its suitability (taste, safety, nutritional content, etc.) for consumption.

The antimicrobial-infused solids of the present invention may be effective against a wide range of pathogenic microbes. By way of first non-limiting example, the solids may have a bactericidal effect, i.e. be effective against pathogenic bacteria, such as *Aeromonas caviae, Aeromonas hydrophila, Aeromonas sobria, Bacillus cereus, Brucella* spp., *Campylobacter jejuni, Clostridium botulinum, Clostridium perfringens, Corynebacterium ulcerans, Coxiella burnetii*, enterohemorrhagic *Escherichia coli, Listeria monocytogenes, Plesiomonas shigelloides, Pseudoalteromonas tetraodonis, Pseudomonas* spp., *Salmonella* spp., *Shigella* spp., *Staphylococcus aureus, Streptococcus* spp., *Vibrio cholerae, Vibrio parahaemolyticus, Vibrio vulnificus, Yersinia enterocolitica*, and *Yersinia pseudotuberculosis*. By way of second non-limiting example, the solids may have a fungicidal effect, i.e. be effective against pathogenic fungi, such as *Alternaria* spp., *Aspergillus flavus, Aspergillus parasiticus, Cephalosporium* spp., *Fusarium* spp., *Myrothecium* spp., *Stachybotrys* spp., and *Trichoderma* spp. By way of third non-limiting example, the solids may have a virucidal effect, i.e. be effective against pathogenic viruses, such as *Enterovirus* spp., *Hepatovirus* A, *Norovirus* spp., *Orthohepevirus* A, and *Rotavirus* spp., as well as coronaviruses (e.g. severe acute respiratory syndrome coronavirus 2 (SARS-CoV-2)). By way of fourth non-limiting example, the solids may have an antiparasitic effect, i.e. be effective against pathogenic parasites, such as flatworms (e.g. *Diphyllobothrium* spp., *Fasciola hepatica, Nanophyetus* spp., *Taenia saginata*, and *Taenia solium*), nematodes (e.g. *Anisakis* spp., *Ascaris lumbricoides, Eustrongylides* spp., *Trichinella spiralis*, and *Trichuris trichiura*), and protozoa (e.g. *Acanthamoeba* spp. and other free-living amoebae, *Cryptosporidium parvum, Cyclospora cayetanensis, Entamoeba histolytica, Giardia lamblia, Sarcocystis hominis, Sarcocystis suihominis*, and *Toxoplasma gondii*).

Embodiments of the present disclosure include infused solids, e.g. marshmallows, containing ozone molecules that are incorporated into the packaging of a food product. During transportation and storage of the packaged food product, ozone is gradually released from the infused solid, thereby exerting an antimicrobial or sterilizing effect on the packaged food product. One advantage of these embodiments is that no expensive equipment or machinery is required to subject the packaged food product to antimicrobial ozone treatment, and the infused solid may be quickly and inexpensively placed in the packaging during the normal course of manufacture of the packaged food product.

Embodiments of the present disclosure also include articles of manufacture, such as bladders, liners, pads, and the like, that may encapsulate ozone and be placed in the packaging of food products. In some embodiments, a material of the article, e.g. paper, plastic, or the like, may be impregnated with an ozone-infused crystalline solid (such as salt or sugar), whereby the ozone may be released into the packaging when the article absorbs liquids (blood, condensation, etc.) from the food product and the crystalline solid is dissolved. Additionally and/or alternatively, moisture and food fluids may physically break down an encapsulation medium that contains the ozone, either gradually or at one or more discrete times. In still further embodiments, the article may comprise a quilted or stamped material comprising voids, wherein the voids contain ozone at a higher pressure than that of a surrounding environment, whereby the ozone may be released by effusion into the food packaging; in these embodiments, different materials and packaging media may be selected to provide for a controlled and/or desired effusion rate. One advantage of these embodiments is that they may advantageously utilize other materials already used in food packaging, such that there is no need to retool or retrofit existing production lines or equipment.

Embodiments of the present disclosure also include methods for antimicrobial treatment of a target item using antimicrobial-infused crystals of a crystalline solid. In some embodiments, the method includes the step of applying the antimicrobial-infused crystals directly to a surface of the target item (e.g. a portion of meat or raw produce). In some embodiments, the method includes the step of adding the antimicrobial-infused crystals in a "loose" or "bulk" form into packaging of the target item (e.g. a container for raw meat, a bag of raw produce, etc.) and/or into a shipping container in which the target item is shipped or transported (e.g. a refrigerated truck). In some embodiments, the method includes the step of placing an article of manufacture (e.g. a bladder, liner, pad, etc.) comprising the antimicrobial-infused crystals in packaging of the target item and/or in a shipping container in which the target item is shipped or transported. The mechanisms by which the antimicrobial-infused crystals may, in the practice of these methods, release the antimicrobial agent to allow for antimicrobial treatment of the target item are described throughout this disclosure.

It is to be expressly understood that antimicrobial treatment according to the present invention is generally effected by effusion or other physical release of the gas-phase anti-microbial agent from the solid medium or matrix of the antimicrobial-infused crystalline solid into a surrounding atmosphere or environment. It therefore follows that suitable target items for antimicrobial treatment may be any surface, item, or substance within such atmosphere or environment, or indeed the atmosphere or environment itself. By way of first non-limiting example, where the antimicrobial-infused crystalline solid of the present invention is placed in packaging of a food product, the target item for antimicrobial treatment may be the food product (e.g. meat or raw produce) and/or an interior surface or volume of the packaging. By way of second non-limiting example, where the antimicrobial-infused crystalline solid of the present invention is placed in a volume of liquid, the target item for antimicrobial treatment may be any one or more of the volume of liquid itself (e.g. a volume of wastewater or potentially contaminated drinking water), a container or vessel holding the volume of liquid, or a gas headspace surrounding or adjacent to the volume of liquid. By way of third non-limiting example, where the antimicrobial-infused crystalline solid of the present invention is placed on a surface within a room or other enclosed space, the target item for antimicrobial treatment may be the surface(s) on which the solid is placed (e.g. a countertop or table, such as in a bathroom, kitchen, or hospital operating room) and/or the air in the enclosed space. The antimicrobial-infused crystalline solids of the present invention may thus be effective against foodborne, surface-borne, waterborne (or other liquid-borne), and/or airborne (or other gas-borne) microbes.

As disclosed herein, molecules of a gas-phase antimicrobial agent may be present within any one or more of a crystal of the lattice structure of the crystalline solid, a hole in the lattice structure of the crystalline solid, a crystal-crystal grain boundary of the lattice structure of the crystalline solid, and/or a fluid inclusion of a crystal of the lattice structure of the crystalline solid. Accordingly, the gas-phase antimicrobial agent may be released from the lattice structure and made available to exert an antimicrobial effect against a surrounding environment upon disruption of the lattice structure. Such a disruption may be effected, by way of non-limiting example, by dissolution of the crystalline solid in a liquid with which the crystalline solid comes into contact (e.g. blood absorbed from a meat product, moisture present in humid air, etc.) or a phase change of the crystalline solid from a crystalline state to an amorphous state (e.g. upon an increase in temperature). As a result, it is possible, according to the methods of the present invention, to manufacture an antimicrobial-infused crystalline solid under one condition (e.g. a lower-temperature or lower-humidity condition) which can remain highly stable (i.e. with little or no diffusion or effusion of the gas-phase antimicrobial agent out of the lattice structure) over a period of days, weeks, or months, until exposed to a second condition (e.g. a higher-temperature or higher-humidity condition). In this way, a mechanism of release of the gas-phase antimicrobial agent from the solid medium or matrix of the antimicrobial-infused crystalline solid may be selected or controlled to adapt an antimicrobial treatment regimen according to the nature of the target item, atmosphere, or environment.

Additionally, the antimicrobial-infused crystalline solid can therefore be manufactured and then stored for extended periods before use.

It is to be expressly understood that the antimicrobial-infused crystalline solids of the present invention can be configured to effectively release the gas-phase antimicrobial agent under a wide range of humidity/ambient moisture conditions. More particularly, while in some embodiments a release of the gas-phase antimicrobial agent may be triggered or accelerated by applying a liquid, such as a solvent (e.g. water), to the crystals and/or by increasing the humidity of the environment in which the crystals are placed, the gas-phase antimicrobial agent may nevertheless be effectively released under "dry" conditions (i.e. in a relatively dry atmosphere and without addition of moisture or other liquids) as well, e.g. as a result of a relatively high ambient temperature and/or increasing an ambient temperature.

Another related advantage and benefit of the compositions and methods of the present invention is that a controlled and/or extended release of the gas-phase antimicrobial agent can be provided for. Specifically, a person of ordinary skill in the art, understanding the rate at which various crystalline solids may melt, dissolve, etc. under particular conditions of temperature and humidity, may be able to select a desired mass of antimicrobial-infused crystalline solid, possessing a desired concentration of the gas-phase antimicrobial agent, to exert an antimicrobial effect against a target having a selected mass, volume, etc. over a selected time, under particular anticipated temperature and/or humidity conditions. Thus, the compositions of the present invention may be advantageously tailored or engineered for particular applications.

Referring now to FIG. 1, a system 100 for producing an ozonated crystalline solid is illustrated. The system 100 comprises an oxygen concentrator 101, one or more ozone generators 102, a sealable chamber 103, a heat source 104, a pressure vessel 105, an atomizer 106, a nozzle 107, an air compressor 108, a heat trace 109, and a nitrogen source 110.

In operation of the system 100, the oxygen concentrator 101 produces an oxygen-enriched gas stream 111 from ambient air (e.g. by pressure swing adsorption and/or membrane separation) and provides this oxygen-enriched gas stream 111 to the ozone generator(s) 102, which converts at least a portion of the diatomic oxygen in the oxygen-enriched gas stream 111 to ozone (e.g. by a corona discharge method, an ultraviolet light method, a cold plasma method, and/or an electrolytic method). The production of this ozone-containing stream 112 may be continuous, semi-continuous, or batch. It is to be expressly understood that the oxygen concentrator 101 may, in embodiments of the system 100 within the scope of the present invention, be replaced or supplemented by any suitable means of providing an oxygen-enriched gas stream 111 (e.g. a gas stream having an oxygen content of at least about 40 wt %) to the ozone generator(s) 112.

Once generated, the ozone-containing stream 112 flows from the ozone generator 102 into the sealable chamber 103 to produce a positive pressure in the sealable chamber 103, typically between about 0.001 psi and about 2.500 psi, more typically between about 0.625 psi and about 1.875 psi, and most typically about 1.25 psi. Ozone is allowed to flow through the sealable chamber 103 for sufficient time to achieve a desired ozone concentration in the sealable chamber 103 before any further material is introduced to the sealable chamber 103; typically, the desired ozone concentration may be at least about 3.0 wt %, at least about 3.5 wt %, at least about 4.0 wt %, at least about 4.5 wt %, at least about 5.0 wt %, at least about 5.5 wt %, at least about 6.0 wt %, at least about 6.5 wt %, at least about 7.0 wt %, at least about 7.5 wt %, at least about 8.0 wt %, at least about 8.5 wt %, at least about 9.0 wt %, at least about 9.5 wt %, or at least about 10.0 wt % of the total gas in the sealable chamber 103. Throughout the production process, ozone continues to flow through the sealable chamber 103, except when an atomized solution of a crystalline solid is introduced into the sealable chamber 103, as described in greater detail below. Those of ordinary skill in the art will understand how to select appropriate flow rates and times depending on the volume of the sealable chamber 103 and desired production rate for the ozonated crystalline solid; by way of non-limiting example, where the volume of the sealable chamber 103 is approximately 2 cubic feet, the ozone-containing stream 112 may be flowed through the sealable chamber 103 at a rate of approximately 10 liters per minute for a period of approximately two hours.

Separately, a heat source 104 is used to heat a solvent, typically but not always water, to a temperature sufficient to dissolve the crystalline solid in the solvent to a desired extent and/or induce a desired degree of amorphousness in the crystalline solid. By way of non-limiting example, where the crystalline solid is erythritol and it is desired to form a solution that is two parts by weight erythritol and one part by weight water, the heat source 104 may be used to heat the water to a temperature of approximately 170° F.; those of ordinary skill in the art will understand how to select an appropriate temperature based on the selected crystalline solid and solvent and the desired concentration of the crystalline solid in the resulting solution. The heat source 104 may heat the solvent before, during, and/or after addition of the crystalline solid to the solvent. Once the solvent has reached an appropriate temperature and the crystalline solid has been dissolved therein to a desired extent, the heat trace 109 is activated to heat the manifold of the atomizer 106 and the high-pressure line from the atomizer 106 into the sealable chamber 103, to reduce the extent to which the solution cools as it passes through the atomizer 106 and into the sealable chamber 103. The pressure vessel 105 and atomizer 106 may be primed, flushed (e.g. with hot water or similar), and cleared of any residual solvent or foulants at this point.

Once the solution of the crystalline solid in the solvent is prepared, the oxygen concentrator 101 and ozone generator(s) 102 are deactivated, and the sealable chamber 103 is sealed (i.e. any input and/or output valves are closed). The heated crystalline solid solution 114 is then transferred from the heat source 104 to the pressure vessel 105, which may preferably be pre-heated to prevent excessive cooling of the solution, and pressurized to an appropriate extent using the air compressor 108, typically to a pressure of between about 25 psi and about 55 psi, more typically to a pressure of between about 30 psi and about 50 psi, even more typically to a pressure of between about 35 psi and about 45 psi, and most typically to a pressure of about 40 psi. The atomizer 106 may then be primed with a portion of the heated solution before being charged.

The atomizer 106 is then charged with the heated solution of the crystalline solid 114, greatly pressurizes the crystalline solid solution 114 (e.g. to about 1,000 psi), and dispenses an atomized burst 113 of the crystalline solid solution through the nozzle 107 into the sealable chamber 103. An appropriate nozzle 107 may be selected to deliver the crystalline solid solution to the sealable chamber 103 at an appropriate flow rate and pressure; by way of non-limiting example, where a volume of the sealable chamber is about 2 cubic feet, a nozzle 107 may be selected to deliver the solution at a flow rate of approximately 0.06 liters per minute and a pressure of approximately 1,000 psi. The atomizer 106 may then be disconnected or isolated from the sealable chamber 103. Any solution remaining in the atomizer 106 is flushed and the atomizer 106 is cleared (e.g. using hot water or similar), and the heat trace 109 is deactivated. The oxygen concentrator 101 and ozone generator(s) 102 are then reactivated, and the input and output valves of the sealable chamber 103 are reopened to allow ozone to again flow through the sealable chamber 103. In this way, the flow of ozone may remove moisture from the sealable chamber 103 to allow the ozonated crystalline solid to dry and form on inner surfaces of the sealable chamber 103 in an ozone-rich environment. Any one or more of the procedures detailed above may then be repeated to allow for additional production and formation of ozonated crystalline solid on the interior surfaces of the sealable chamber 103.

Once a desired mass of ozonated crystalline solid has been produced and deposited on the interior surfaces of the sealable chamber 103, ozone may be flowed through the sealable chamber 103 for an additional time (which may in embodiments be about four hours, but can be selected by those skilled in the art) to remove any residual moisture and cause drying and formation of a last "batch" of ozonated crystalline solid in the sealable chamber 103. The oxygen concentrator 101 and ozone generator(s) 102 may then be finally deactivated, whereupon the sealable chamber 103 is again sealed and allowed to stand for a suitable period (which may in embodiments be about twelve hours, but can be selected by those skilled in the art). The nitrogen source 110 may then be activated and a nitrogen stream 115 may be allowed to flow through the sealable chamber 103 to clear any residual "free" ozone (i.e. ozone that has not been captured within crystals of the ozonated crystalline solid) remaining in the sealable chamber 103. Finally, the sealable chamber 103 may be opened and the ozonated crystalline solid may be collected. The total mass of ozonated crystalline solid will depend on the scale of gas flow rates, mass of solution introduced into the sealable chamber 103, etc., but a total yield of 25 to 30 grams is typical of a sealable chamber 103 having a volume of approximately 2 cubic feet after two bursts 113.

Figure 2:
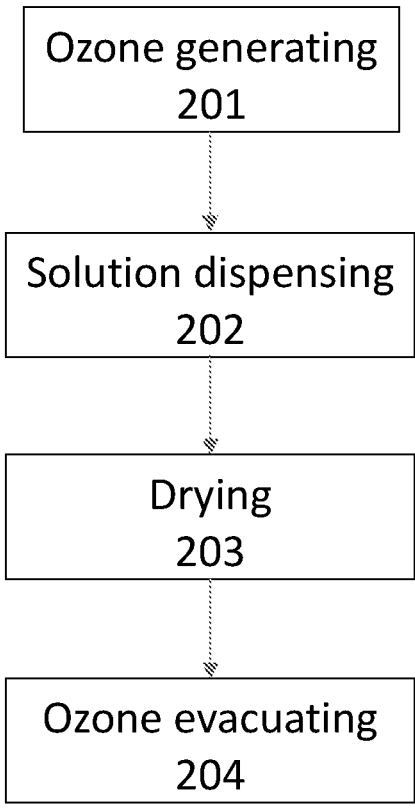
FIG. 2 is a flowchart illustrating a method for producing an ozonated crystalline solid, according to embodiments of the present disclosure.

Referring now to FIG. 2, a method 200 for producing an ozonated crystalline solid is illustrated. The method 200 comprises an ozone generating step 201, a solution dispensing step 202, a drying step 203, and an ozone evacuating step 204.

In the ozone generating step 201 of the method 200, a stream of gas comprising ozone is generated and introduced into a sealable chamber. The ozone-containing stream may be produced by any suitable known method, but may in particular embodiments be produced by first producing an oxygen-enriched gas stream from ambient air (e.g. by pressure swing adsorption and/or membrane separation) and then converting at least a portion of the diatomic oxygen in the oxygen-enriched gas stream to ozone (e.g. by a corona discharge method, an ultraviolet light method, a cold plasma method, and/or an electrolytic method). The ozone generating step 201 may be carried out as a continuous process, a semi-continuous process, or a batch process, and will most commonly result in pressurizing the sealable chamber to a positive pressure of between about 0.001 psi and about 2.500 psi, more typically between about 0.625 psi and about 1.875 psi, and most typically about 1.25 psi. As part of the ozone generating step 201, the ozone-containing stream may be allowed to flow through the sealable chamber for sufficient time to achieve a desired ozone concentration in the sealable chamber before any further material is introduced to the sealable chamber; typically, the desired ozone concentration may be at least about 3.0 wt %, at least about 3.5 wt %, at least about 4.0 wt %, at least about 4.5 wt %, at least about 5.0 wt %, at least about 5.5 wt %, at least about 6.0 wt %, at least about 6.5 wt %, at least about 7.0 wt %, at least about 7.5 wt %, at least about 8.0 wt %, at least about 8.5 wt %, at least about 9.0 wt %, at least about 9.5 wt %, or at least about 10.0 wt % of the total gas in the sealable chamber. Those of ordinary skill in the art will understand how to select appropriate flow rates and times depending on the volume of the sealable chamber and desired production rate for the ozonated crystalline solid; by way of non-limiting example, where the volume of the sealable chamber is approximately 2 cubic feet, the ozone-containing stream may be flowed through the sealable chamber at a rate of approximately 10 liters per minute for a period of approximately two hours.

In the solution dispensing step 202 of the method 200, a heated solution of a crystalline solid in a solvent is atomized and dispensed into the ozone-containing sealable chamber. Particularly, a solvent may be heated to a temperature sufficient to dissolve the crystalline solid in the solvent to a desired extent, and/or induce a desired degree of amorphous-ness in the crystalline solid, before, during, and/or after addition of the crystalline solid to the solvent; those of ordinary skill in the art will understand how to select an appropriate temperature based on the selected crystalline solid and solvent and the desired concentration of the crystalline solid in the resulting solution. Once the solution of the crystalline solid in the solvent is prepared, the sealable chamber may be sealed (i.e. any input and/or output valves are closed), and the solution of the crystalline solid may be pressurized to an appropriate extent before being dispensed into the sealable chamber via an atomized burst through a nozzle. Input and output valves of the sealable chamber may then be reopened (and, if appropriate, devices used in the ozone generating step 201 may be reactivated to produce further ozone) to allow ozone to again flow through the sealable chamber, thereby removing moisture from the sealable chamber and allowing the ozonated crystalline solid to dry and form on inner surfaces of the sealable chamber in an ozone-rich environment.

It is to be expressly understood that solution dispensing step 202 may be carried out only once, or may be repeated as many time as necessary to yield a desired mass of ozonated crystalline solid.

In the drying step 203 of the method 200, ozone is flowed through the sealable chamber for an additional time (which may in embodiments be about four hours, but can be selected by those skilled in the art) to remove any residual moisture and cause final drying and formation of ozonated crystalline solid in the sealable chamber. After the final flow of ozone through the sealable chamber, the sealable chamber may again be sealed and allowed to stand for a suitable period (which may in embodiments be about twelve hours, but can be selected by those skilled in the art).

In the ozone evacuating step 204 of the method 200, any residual ozone is removed from the sealable chamber by any suitable means. Particularly, nitrogen (and/or another non-reactive/inert carrier gas) may be allowed to flow through the sealable chamber, and/or a negative pressure/vacuum may be applied to the sealable chamber, to clear and/or evacuate any residual "free" ozone (i.e. ozone that has not been captured within crystals of the ozonated crystalline solid) remaining in the sealable chamber. This allows the sealable chamber to be opened and the ozonated crystalline solid to be collected by any suitable means.

Figure 3:
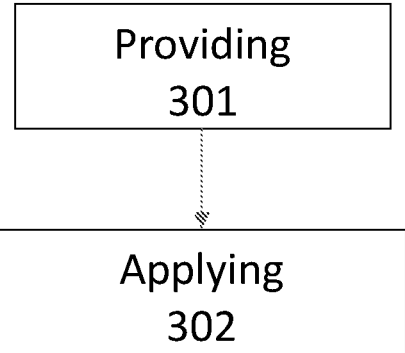
FIG. 3 is a flowchart illustrating a method for subjecting a target object to antimicrobial treatment, according to embodiments of the present disclosure.

Referring now to FIG. 3, a method 300 for subjecting a target object to antimicrobial treatment is illustrated. The method 300 comprises an infused crystalline solid providing step 301 and an antimicrobial applying step 302.

In the infused crystalline solid providing step 301 of the method 300, crystals of a crystalline solid infused with a gas-phase antimicrobial agent may be provided using any one or more of the methods and/or systems described herein.

In the antimicrobial applying step 302 of the method 300, antimicrobial-infused crystals of the crystalline solid are applied to a target item intended to be subjected to antimicrobial treatment. It is to be expressly understood that the antimicrobial applying step 302 can take any one or more of several forms. In some embodiments, the antimicrobial applying step 302 may comprise applying the infused crystals directly to a surface of the target item (e.g. a surface or portion of meat or raw produce). In some embodiments, the antimicrobial applying step 302 may comprise adding the infused crystals in a "loose" or "bulk" form into packaging of the target item (e.g. a container for raw meat, a bag of raw produce, etc.) and/or into a shipping container in which the target item is shipped or transported (e.g. a refrigerated truck). In some embodiments, the antimicrobial applying step 302 may comprise placing an article of manufacture (e.g. a bladder, liner, pad, etc.) comprising the infused crystals in packaging of the target item and/or in a shipping container in which the target item is shipped or transported. In some embodiments, where the target item is a volume of liquid (e.g. a volume of wastewater or potentially contaminated drinking water), the antimicrobial applying step 302 may comprise placing the infused crystals in, or on a surface of, the volume of liquid. In some embodiments, where the target item is a room or other enclosed space, or one or more solid items or surfaces disposed therein, the antimicrobial applying step 302 may comprise placing the infused crystals (or an article of manufacture containing the infused crystals) in the room or other enclosed space; in certain of these embodiments, the antimicrobial applying step 302 may then further comprise selectively altering a temperature or humidity of the enclosed space, selectively altering a temperature of the crystals, and/or applying a liquid to the infused crystals, to cause at least a portion of the infused crystals to dissolve or become amorphous and thereby release the gas-phase antimicrobial agent into the enclosed space. The mechanisms by which the infused crystals may, in the practice of these methods, release the ozone to allow for antimicrobial treatment of the target item are further described throughout this disclosure.

One particular advantage of the method 300 illustrated in FIG. 3, and of the shelf stability of the antimicrobial-infused crystalline solids of the present invention, is that the antimicrobial applying step 302 may be carried out a significant length of time after the infused crystalline solid providing step 301 is carried out. Thus, the infused crystalline solid may be manufactured and then subsequently stored or transported, over a period of days, weeks, or months, before the gas-phase antimicrobial agent is released therefrom in antimicrobial applying step 302. In embodiments, a period between infused crystalline solid providing step 301 and antimicrobial applying step 302 may be at least about one day, at least about two days, at least about three days, at least about four days, at least about five days, at least about six days, at least about seven days, at least about eight days, at least about nine days, at least about ten days, at least about eleven days, at least about twelve days, at least about thirteen days, at least about two weeks, at least about three weeks, at least about one month, at least about two months, at least about three months, at least about four months, at least about five months, or at least about six months.

While the description of the present invention has generally focused on ozone as the gas-phase antimicrobial agent, it is to be expressly understood that other gas-phase antimicrobial agents may suitably be used, mutatis mutandis, and are within the scope of the present invention. Non-limiting examples of such gas-phase antimicrobial agents include iodine and iodine compounds and chlorine dioxide. In some embodiments, the gas-phase material incorporated into the infused crystalline solids of the present invention may include a small-molecule, rare, and/or substantially inert gas, such as, by way of non-limiting example, helium or argon.

The invention is further described by the following illustrative, non-limiting Examples.

Example 1

This Example demonstrates the use of an ozonated Epsom salt made according to the present invention as an antimicrobial agent for raw produce.

An ozonated Epsom salt (i.e. a plurality of magnesium sulfate crystals infused with ozone) was made using a system as depicted in FIG. 1 according to a method as depicted in FIG. 2.

Four bags, each containing 5.5 ounces of raw spinach, were obtained from a grocery store. Of these four bags, one was left unopened to be used as an experimental control; the other three bags were opened, and the raw spinach in each opened bag was inoculated with one million colony forming units ($1.0 \cdot 10^6$ CFU) of each of two common foodborne microbes: *Salmonella typhimurium* (ATCC 13311) and *Escherichia coli* (ATCC 10536). 1.1 mL of sterile deionized water was also added to each of the three opened bags. 1.1 grams of the ozonated Epsom salt was added to two of the three opened bags, while 1.1 grams of conventional (non-ozonated) Epsom salt was added to the third opened bag. Each of the three opened bags was heat-sealed to produce a closed environment, and the contents of the heat-sealed bags were then thoroughly mixed to ensure a substantially uniform distribution of inoculated bacteria, salt, and water throughout each bag.

The four bags of spinach were placed in a refrigerator (maintained throughout at a temperature of between 0° C. and 10° C.) and left in the refrigerator for 23 hours. After 23 hours, samples of 25±0.2 grams of spinach were taken from each bag and placed in Whirl-Pak® bags for testing. Each sample was assayed for *S. typhimurium* counts (via bio-Mérieux VIDAS testing), *E. coli* counts (via 3M Petrifilm plating), and total plate count (via 3M Petrifilm plating). The results are given in Table 1; quantitative results are reported for total plate counts and *E. coli*, while *S. typhimurium* results are given as either positive or negative.

As Table 1 indicates, the ozonated salt greatly inhibited the total plate count of all bacteria relative to the control or a non-ozonated salt (on average, by about 44%). This result demonstrates the utility of the ozonated Epsom salt as a broad-spectrum antibacterial agent.

Visual observation of the four bags of spinach indicated that while spinach in the bags to which salt had been added had wilted to a greater extent than the spinach in the unopened bag, the spinach in the ozonated salt bags was less wilted than spinach in the non-ozonated salt bag. This result indicates that the ozonated salt may extend the useful shelf life of raw produce, such as raw spinach.

Example 2

This Example demonstrates the efficacy of an ozonated erythritol made according to the present invention as an antimicrobial agent for raw produce.

An ozonated erythritol (i.e. a plurality of erythritol crystals infused with ozone) was made using a system as depicted in FIG. 1 according to a method as depicted in FIG. 2.

25 g of bulk raw spinach was placed in each of seven Whirl-Pak® sample processing bags. Of these seven bags, one was immediately heat-sealed to create a closed environment and used as an uninoculated control; in each of the other six bags, the raw spinach was inoculated with one million colony forming units ($1.0 \cdot 10^6$ CFU) of *Escherichia coli* (ATCC 10536). One of these six bags was then immediately heat-sealed to create a closed environment and used as an inoculated control. Of the other five inoculated bags, one ("erythritol") received 1.1 mL of sterile deionized water and 1.1 g of non-ozonated erythritol; two ("OZ+H₂O") received 1.1 mL of sterile deionized water and 1.1 g of ozonated erythritol; and two ("OZ") received 1.1 g of ozonated erythritol only. Each of the five inoculated, treated bags was heat-sealed to produce a closed environment, and the contents of the heat-sealed bags were then thoroughly mixed to ensure a substantially uniform distribution of inoculated bacteria, erythritol, and water throughout each bag. Visual observation of the OZ+H₂O bags showed that the ozonated erythritol, upon contact with the deionized water, initially bubbled and formed a somewhat paste-like mass, but that this paste-like mass fully dissolved into the water with additional mixing.

The seven bags of spinach were placed in a walk-in cooler (maintained throughout at a temperature of between 0° C. and 10° C.) and left in the cooler overnight. Subsequently, leaves were removed from each of the seven bags and tested for their water activity. The spinach in each bag was also assayed for *E. coli* and total plate count via 3M Petrifilm plating. The results are given in Table 2.

TABLE 2

| Sample | Total plate count (CFU/gram) | E. coli (CFU/gram) | Water activity |
|---|---|---|---|
| Uninoculated control | $2.0 \cdot 10^7$ | <1,000* | 0.997 |
| Inoculated control | $9.4 \cdot 10^5$ | 200,000 | 0.996 |
| Erythritol | $2.8 \cdot 10^7$ | 18,000 | 0.978 |
| OZ + H₂O #1 | $9.9 \cdot 10^5$ | 550 | 0.986 |
| OZ + H₂O #2 | $5.0 \cdot 10^5$ | 220 | 0.987 |
| OZ #1 | $4.4 \cdot 10^5$ | 350 | 0.986 |
| OZ #2 | $6.6 \cdot 10^5$ | 440 | 0.977 |

*More precise quantification not possible due to total coliform growth.

As Table 2 indicates, the ozonated erythritol greatly inhibited the total plate count of all bacteria relative to the

TABLE 1

| Sample | Total plate count (CFU/gram) | E. coli (CFU/gram) | S. typhimurium |
|---|---|---|---|
| Control | $1.5 \cdot 10^8$ | <1,000* | Negative |
| Non-ozonated salt | $1.5 \cdot 10^8$ | 25,000 | Positive |
| Ozonated salt #1 | $1.1 \cdot 10^8$ | 30,000 | Positive |
| Ozonated salt #2 | $5.9 \cdot 10^7$ | 26,000 | Positive |

*More precise quantification not possible due to total coliform growth.

uninoculated control and non-ozonated erythritol treatment (on average, by about 97% compared to the uninoculated control and by about 98% compared to non-ozonated erythritol treatment), and greatly inhibited *E. coli* growth relative to the inoculated control and non-ozonated erythritol treatment (on average, by about 99.8% compared to the inoculated control and by about 98% compared to non-ozonated erythritol treatment). This result demonstrates the utility of the ozonated erythritol as both a broad-spectrum antibacterial agent and an antimicrobial agent against *E. coli* particularly. Notably, although the antibacterial effect was somewhat enhanced in the absence of added water, the ozonated erythritol retained significant antibacterial effect under both "wet" and "dry" conditions.

Visual observation of the seven bags of spinach showed some damage to the leaf structure of spinach treated with erythritol, compared to little or no damage to the leaf structure of the spinach in the control bags.

Example 3

This Example demonstrates the efficacy of an ozonated erythritol made according to the present invention as an antimicrobial agent for raw produce.

An ozonated erythritol (i.e. a plurality of erythritol crystals infused with ozone) was made using a system as depicted in FIG. 1 according to a method as depicted in FIG. 2.

25 g of bulk raw spinach was placed in each of eight Whirl-Pak® sample processing bags. Of these eight bags, one was immediately heat-sealed to create a closed environment and used as an uninoculated control; in each of the other seven bags, the raw spinach was inoculated with one million colony forming units ($1.0 \cdot 10^6$ CFU) of *Escherichia coli* (ATCC 10536). One of these seven bags was then immediately heat-sealed to create a closed environment and used as an inoculated control. Of the other six inoculated bags, one ("erythritol") received 1.1 mL of sterile deionized water and 1.1 g of non-ozonated erythritol; one ("½ erythritol") received 0.5 mL of sterile deionized water and 0.5 g of non-ozonated erythritol; two ("OZ+H₂O") received 1.1 mL of sterile deionized water and 1.1 g of ozonated erythritol; and two ("OZ") received 1.1 g of ozonated erythritol only. Each of the six inoculated, treated bags was heat-sealed to produce a closed environment, and the contents of the heat-sealed bags were then thoroughly mixed to ensure a substantially uniform distribution of inoculated bacteria, erythritol, and water throughout each bag. Visual observation of the OZ+H₂O bags showed that the ozonated erythritol, upon contact with the deionized water, initially bubbled and formed a somewhat paste-like mass, but that this paste-like mass fully dissolved into the water with additional mixing.

The eight bags of spinach were placed in a walk-in cooler (maintained throughout at a temperature of between 0° C. and 10° C.) and left in the cooler overnight. Subsequently, the spinach in each bag was assayed for *E. coli* and total plate count via 3M Petrifilm plating. The results are given in Table 3.

TABLE 3

| Sample | Total plate count (CFU/gram) | *E. coli* (CFU/gram) |
|---|---|---|
| Uninoculated control | $1.0 \cdot 10^8$ | <10 |
| Inoculated control | $6.4 \cdot 10^7$ | 7,600 |

TABLE 3-continued

| Sample | Total plate count (CFU/gram) | *E. coli* (CFU/gram) |
|---|---|---|
| Erythritol | $9.4 \cdot 10^5$ | 8,000 |
| ½ erythritol | $4.3 \cdot 10^5$ | 7,800 |
| OZ + H₂O #1 | $4.3 \cdot 10^5$ | 20 |
| OZ + H₂O #2 | $6.4 \cdot 10^4$ | 60 |
| OZ #1 | $4.6 \cdot 10^4$ | 180 |
| OZ #2 | $2.4 \cdot 10^5$ | 410 |

As Table 3 indicates, the ozonated erythritol greatly inhibited the total plate count of all bacteria relative to both controls and non-ozonated erythritol treatment (on average, by about 99.8% compared to the uninoculated control, by about 99.7% compared to the inoculated control, and by about 72% compared to non-ozonated erythritol treatment), and greatly inhibited *E. coli* growth relative to the inoculated control and non-ozonated erythritol treatment (on average, by about 98% compared to both the inoculated control and non-ozonated erythritol treatment). Notably, the ozonated erythritol retained significant antibacterial effect under both "wet" and "dry" conditions.

Visual observation of the seven bags of spinach showed some damage to the leaf structure of spinach treated with erythritol, compared to little or no damage to the leaf structure of the spinach in the control bags. Leaves treated with ozonated erythritol also exhibited some slight browning.

Example 4

This Example demonstrates the efficacy of an ozonated erythritol made according to the present invention as an antimicrobial agent for raw produce.

An ozonated erythritol (i.e. a plurality of erythritol crystals infused with ozone) was made using a system as depicted in FIG. 1 according to a method as depicted in FIG. 2.

25 g of bulk raw spinach was placed in each of four Whirl-Pak® sample processing bags. Of these four bags, one was immediately heat-sealed to create a closed environment and used as an uninoculated control; in each of the other three bags, the raw spinach was inoculated with one million colony forming units ($1.0 \cdot 10^6$ CFU) of *Escherichia coli* (ATCC 10536). One of these three bags was then immediately heat-sealed to create a closed environment and used as an inoculated control. Of the other two inoculated bags, one ("erythritol") received 1.1 g of non-ozonated erythritol only (no water), and one ("OZ") received 1.1 g of ozonated erythritol only (no water). Each of the two inoculated, treated bags was heat-sealed to produce a closed environment, and the contents of the heat-sealed bags were then thoroughly mixed to ensure a substantially uniform distribution of inoculated bacteria, erythritol, and water throughout each bag.

The four bags of spinach were placed in a walk-in cooler (maintained throughout at a temperature of between 0° C. and 10° C.) and left in the cooler overnight. Subsequently, the spinach in each bag was assayed for *E. coli* and total plate count via 3M Petrifilm plating. The results are given in Table 4.

TABLE 4

| Sample | Total plate count (CFU/gram) | E. coli (CFU/gram) |
|---|---|---|
| Uninoculated control | $1.8 \cdot 10^7$ | <10 |
| Inoculated control | $3.1 \cdot 10^7$ | 500,000 |
| Erythritol | $9.2 \cdot 10^6$ | 310,000 |
| OZ | $9.6 \cdot 10^4$ | 3,100 |

As Table 4 indicates, the ozonated erythritol greatly inhibited the total plate count of all bacteria relative to both controls and non-ozonated erythritol treatment (by about 95% compared to the uninoculated control, about 97% compared to the inoculated control, and about 90% compared to non-ozonated erythritol treatment), and greatly inhibited E. coli growth relative to the inoculated control and non-ozonated erythritol treatment (by about 99.4% compared to the inoculated control and by 99% compared to non-ozonated erythritol treatment).

Visual observation of the seven bags of spinach showed some damage to the leaf structure of spinach treated with erythritol, compared to little or no damage to the leaf structure of the spinach in the control bags.

Example 5

This Example demonstrates the efficacy of an ozonated erythritol made according to the present invention as an antimicrobial agent for raw produce.

An ozonated erythritol (i.e. a plurality of erythritol crystals infused with ozone) was made using a system as depicted in FIG. 1 according to a method as depicted in FIG. 2.

25 g of bulk raw spinach was placed in each of thirteen Whirl-Pak® sample processing bags. Of these thirteen bags, one bags was immediately heat-sealed to create a closed environment and used as an uninoculated control; four bags were inoculated with one million colony forming units ($1.0 \cdot 10^6$ CFU) of Staphylococcus aureus; four bags were inoculated with one million CFU of Pseudomonas aeruginosa; and four bags were inoculated with one million CFU of E. coli O157:H7. For each set of four bags inoculated with a given species of bacterium, one bag was heat-sealed without further treatment and used as an inoculated control;

two bags ("OZ") received 1.1 grams each of ozonated erythritol; and one bag ("erythritol") received 1.1 grams of non-ozonated erythritol. Each of the nine inoculated, treated bags was heat-sealed to produce a closed environment, and the contents of the heat-sealed bags were then thoroughly mixed to ensure a substantially uniform distribution of inoculated bacteria and erythritol throughout each bag.

The thirteen bags of spinach were placed in a walk-in cooler (maintained throughout at a temperature of between 0° C. and 10° C.) and left in the cooler overnight. Subsequently, the spinach in each bag was assayed for each of the three bacterial species, as well as total aerobe plate count. The results are given in Table 5.

TABLE 5

| Sample | Total aerobes (CFU/gram) | E. coli O157:H7 (CFU/gram) | S. aureus (CFU/gram) | P. aeruginosa (CFU/gram) |
|---|---|---|---|---|
| Uninoculated control | $8.2 \cdot 10^6$ | <10 | >10,000* | >10,000* |
| S. aureus control | $9.5 \cdot 10^6$ | n/a | 60,000 | n/a |
| S. aureus erythritol | $1.2 \cdot 10^7$ | n/a | 4,600 | n/a |
| S. aureus OZ #1 | $4.4 \cdot 10^6$ | n/a | 160 | n/a |
| S. aureus OZ #2 | $4.2 \cdot 10^6$ | n/a | 8,900 | n/a |
| P. aeruginosa control | $5.6 \cdot 10^7$ | n/a | n/a | $1.2 \cdot 10^7$ |
| P. aeruginosa erythritol | $4.7 \cdot 10^7$ | n/a | n/a | $5.2 \cdot 10^6$ |
| P. aeruginosa OZ #1 | $3.5 \cdot 10^6$ | n/a | n/a | $4.5 \cdot 10^5$ |
| P. aeruginosa OZ #2 | $2.0 \cdot 10^6$ | n/a | n/a | $5.1 \cdot 10^5$ |
| E. coli control | $4.5 \cdot 10^7$ | 13,000 | n/a | n/a |
| E. coli erythritol | $6.4 \cdot 10^7$ | 12,000 | n/a | n/a |
| E. coli OZ #1 | $8.1 \cdot 10^7$ | 3,600 | n/a | n/a |
| E. coli OZ #2 | $3.9 \cdot 10^7$ | 6,200 | n/a | n/a |

*Naturally contaminated with Staphylococcus and Pseudomonas species; all plates overgrown As Table 5 indicates, the ozonated erythritol greatly inhibited the growth of all three pathogenic bacteria, by about 62% (vs. control) or 59% (vs. non-ozonated erythritol) for E. coli, by about 92% vs. control for S. aureus, and by about 96% (vs. control) or 91% (vs. non-ozonated erythritol) for P. aeruginosa.

Visual observation of the seven bags of spinach showed some damage to the leaf structure of spinach treated with erythritol, compared to little or no damage to the leaf structure of the spinach in the control bags.

Example 6

An ozonated erythritol (i.e. a plurality of erythritol crystals infused with ozone) was made using a system as depicted in FIG. 1 according to a method as depicted in FIG. 2 and kept in a freezer held at −5° F. for five days. Subsequently, 1 g of ozonated erythritol was placed into each of fifteen one-ounce jars, which were then sealed; five jars were returned to the freezer, five jars were placed in a refrigerator held at 35° F., and five jars were placed in a room held at 67° F. 24 hours after the erythritol was placed in the jars, and every 48 hours thereafter, the ozone concentration of the air inside the jars was measured. The results are given in Table 6; the peak ozone reading in parts per million (ppm) detected over the course of a 30-second measurement period is reported.

23

TABLE 6

|  | Sample No. | 0 hrs. | 24 hrs. | 72 hrs. | 120 hrs. | 168 hrs. | 216 hrs. |
|---|---|---|---|---|---|---|---|
| −5° F. | FSL-01 | 0.00 | 0.00 | 0.00 | 0.00 | 0.00 | 0.00 |
|  | FSL-02 | 0.00 |  | 0.00 | 0.00 | 0.00 | 0.00 |
|  | FSL-03 | 0.00 |  |  | 0.00 | 0.00 | 0.00 |
|  | FSL-04 | 0.00 |  |  |  | 0.00 | 0.00 |
|  | FSL-05 | 0.00 |  |  |  |  | 0.00 |
| 35° F. | RSL-01 | 0.00 | 0.00 | 0.00 | 0.00 | 0.00 | 0.04 |
|  | RSL-02 | 0.00 |  | 0.00 | 0.00 | 0.00 | 0.10 |
|  | RSL-03 | 0.00 |  |  | 0.00 | 0.05 | 0.11 |
|  | RSL-04 | 0.00 |  |  |  | 0.07 | 0.10 |
|  | RSL-05 | 0.00 |  |  |  |  | 0.09 |
| 67° F. | ASL-01 | 0.00 | 0.15 | 21.00 | 17.00 | 14.00 | 0.37 |
|  | ASL-02 | 0.00 |  | 32.00 | 21.00 | 17.00 | 1.48 |
|  | ASL-03 | 0.00 |  |  | 19.00 | 13.00 | 1.40 |
|  | ASL-04 | 0.00 |  |  |  | 0.37 | 1.68 |
|  | ASL-05 | 0.00 |  |  |  |  | 1.28 |

As Table 6 indicates, the release profile of ozone from ozonated erythritol varies dramatically with the temperature of the surrounding environment. At freezer temperatures (about −5° F.), there is no release of ozone into the surrounding environment. At refrigerator temperatures (about 35° F.), there is slow release of ozone over a period of at least about nine days. At ambient temperatures, a large quantity of ozone is released within the first 72 hours, with the concentration slowly declining over the following days. Thus, this Example demonstrates that a release profile of ozone from an antimicrobial-infused crystalline solid can be tuned or selected based on the temperature of the environment in which the antimicrobial-infused crystalline solid is adapted to be used for antimicrobial treatment.

The present disclosure, in various aspects, embodiments, and configurations, includes components, methods, processes, systems and/or apparatus substantially as depicted and described herein, including various aspects, embodiments, configurations, sub-combinations, and subsets thereof. Those of skill in the art will understand how to make and use the various aspects, embodiments, and configurations, after understanding the present disclosure. The present disclosure, in various aspects, embodiments, and configurations, includes providing devices and processes in the absence of items not depicted and/or described herein or in various aspects, embodiments, and configurations hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more, aspects, embodiments, and configurations for the purpose of streamlining the disclosure. The features of the aspects, embodiments, and configurations of the disclosure may be combined in alternate aspects, embodiments, and configurations other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed aspects, embodiments, and configurations. Thus, the following claims are hereby incorporated into this Detailed Description, with each claim standing on its own as a separate preferred embodiment of the disclosure.

Moreover, though the description of the disclosure has included description of one or more aspects, embodiments, or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A system for producing an ozonated crystalline solid, comprising:
   at least one ozone generator, configured to receive an oxygen-enriched gas stream and convert at least a portion of diatomic oxygen in the oxygen-enriched gas stream to ozone to form an ozone-containing gas stream;
   a sealable chamber, comprising:
      an interior volume;
      an input valve, reconfigurable between an open position and a closed position;
      an output valve, reconfigurable between an open position and a closed position; and
      a deposition surface,
      wherein, when the input and output valves of the sealable chamber are in their open positions, the sealable chamber is configured to receive the ozone-containing gas stream from the ozone generator via the input valve and allow the ozone-containing gas stream to flow through the interior volume and out of the sealable chamber via the output valve;
   a heat source, configured to receive and heat a solution of a crystalline solid in a solvent;
   a pressure vessel, configured to pre-pressurize the solution;
   an atomizer, configured to receive the pre-pressurized solution from the pressure vessel, further pressurize the solution, and dispense the solution in atomized form into the sealable chamber via a nozzle when the input and output valves of the sealable chamber are in their closed positions; and
   a heat trace, configured to heat a high-pressure line of the atomizer prior to dispensation of the solution into the sealable chamber,
   wherein the deposition surface of the sealable chamber is configured to allow the ozonated crystalline solid to form thereon after dispensation of the solution into the sealable chamber.

2. The system of claim 1, further comprising an oxygen concentrator, configured to produce the oxygen-enriched gas stream by selectively removing nitrogen from ambient air.

3. The system of claim 1, wherein the crystalline solid is selected from the group consisting of erythritol, sodium chloride, magnesium sulfate, sucrose, sodium bicarbonate, potassium chloride, calcium carbonate, sugar alcohols, acetic acid, and ascorbic acid.

4. The system of claim 1, wherein the solvent consists essentially of water.

5. The system of claim 1, further comprising a carrier gas source, configured to flow a carrier gas through the sealable chamber after dispensation of the solution into the sealable chamber to remove residual ozone from the sealable chamber, wherein the carrier gas comprises nitrogen gas.

* * * * *